(12) United States Patent
Thorpe

(10) Patent No.: US 6,915,882 B2
(45) Date of Patent: Jul. 12, 2005

(54) METHOD AND APPARATUS FOR CONSTRUCTING DISC BRAKES

(75) Inventor: William Anthony Thorpe, Burbage (GB)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 10/450,620

(22) PCT Filed: Dec. 17, 2001

(86) PCT No.: PCT/GB01/05558

§ 371 (c)(1),
(2), (4) Date: Oct. 7, 2003

(87) PCT Pub. No.: WO02/48569

PCT Pub. Date: Jun. 20, 2002

(65) Prior Publication Data

US 2004/0055834 A1 Mar. 25, 2004

(30) Foreign Application Priority Data

Dec. 16, 2000 (GB) .............................................. 0030790

(51) Int. Cl.⁷ ......................... F16D 13/68; F16D 65/12
(52) U.S. Cl. ................. 188/71.5; 188/73.35; 188/73.39
(58) Field of Search ................... 188/71.5, 73.35–73.39

(56) References Cited

U.S. PATENT DOCUMENTS

| 3,754,624 | A | * | 8/1973 | Eldred ........................ 188/71.5 |
| 3,994,378 | A |   | 11/1976 | Schwabe et al. .......... 192/70.28 |
| 4,534,457 | A | * | 8/1985 | Eltze et al. ................. 192/70.2 |
| 6,298,953 | B1 |   | 10/2001 | Bunker |
| 6,305,510 | B1 |   | 10/2001 | Bunker |
| 6,371,250 | B1 |   | 4/2002 | Bunker |
| 6,481,543 | B1 |   | 11/2002 | Shaw et al. |
| 6,484,852 | B1 |   | 11/2002 | Bunker |
| 6,508,338 | B1 |   | 1/2003 | Bunker |
| 6,508,340 | B1 |   | 1/2003 | Bunker |
| 6,520,296 | B1 |   | 2/2003 | Bunker |
| 6,626,269 | B2 |   | 9/2003 | Shaw et al. |

FOREIGN PATENT DOCUMENTS

| DE | 3801911 | 8/1988 |
| GB | 2340561 | 2/2000 |
| WO | WO0009904 | 2/2000 |

* cited by examiner

Primary Examiner—Matthew C. Graham
(74) Attorney, Agent, or Firm—Michael D. Smith

(57) ABSTRACT

A disc brake comprises at least two axially slidable brake discs. The brake discs are mounted for axial sliding movement under the dynamic conditions of use by means of a series of circumferentially spaced wire springs or leaf springs each of which simultaneously receives the at least two brake discs on the axially-extending structure of the spring. As a result, initiation of braking causes simultaneous axial sliding movement of the entire spring and multiple disc assembly as a unit, thereby achieving a more balanced braking action and more even friction pad wear.

8 Claims, 2 Drawing Sheets

METHOD AND APPARATUS FOR CONSTRUCTING DISC BRAKES

BACKGROUND OF THE INVENTION

1. Technical Field

This invention relates to a method and apparatus for constructing disc brakes. And is particularly but not exclusively applicable to spot-type multi-disc automotive disc brakes

2. Related Art

We have a number of pending applications in this technical field, of which representative examples include published WO98/26192 and WO98/25804.

SUMMARY OF THE INVENTION

As we have disclosed in our several applications in this field there are significant advantages which apply to spot-type automotive disc brakes of multi-disc construction, and these advantages are all largely attributable to aspects of the multi disc construction if not to features resulting therefrom such as the significantly greater friction surface area available for braking purposes.

We have discovered that advantages also accrue in relation to apparently unrelated technical areas such as anti skid braking systems (ABS) and braking-by-wire quite apart from the ability to run the system at hydraulic pressures very significantly lower than those normally used with single disc spot-type automotive brakes of the conventional kind.

However, these advantages are, though important, technically related to the requirement to provide for effective mounting and dynamic control of the axially slidable discs, and an important aspect of the advancement of the design of disc brakes in this field therefor concerns improved arrangements for the mounting and dynamic control of multiple axially-movable brake discs.

Thus, for example, it will be appreciated that in a brake comprising twin axially movable discs there is technical benefit to the operation of the brake available from improved ease and control of the axial movement (small though it is) prior to friction face engagement, and from improved maintenance of disc attitude for precise full face friction surface engagement, and indeed as a generality from the provision of a disc mounting and movement system whereby the assembly of twin axially-moveable discs performs (though offering free and controlled axial movement of the discs), with a structural and dynamic cohesiveness which is comparable to that of fixed disc single disc brakes.

With this in mind, the embodiments of the present invention seek to provide enhancement of several aspects of the mounting of the brake discs, notably their unity of movement as a function of their slidable mounting with respect to the central hub which carries them, and an object of the present invention is to provide a method and apparatus offering improvements in one or more of the above-discussed respects, or indeed improvements generally.

According to the invention there is provided a method and apparatus.

In an embodiment of the invention described below a disc brake is provided in which twin rotatable brake discs are mounted on a mounting hub therefor for axial sliding movement thereon in use and for frictional engagement with at least three friction elements interleaved with the brake discs. Resilient means is provided at circumferentially-spaced positions around the brake discs to act between the brake discs and their mounting. The resilient means are adapt axially to straddle the two discs at their circumferentially-spaced positions and so as to apply a resilient bias between the discs and their mounting, the arrangement being such that the resilient means and discs are simultaneously moved in the axial direction during use of the brake.

Likewise in an embodiment, the method of operating the brake comprises the step of causing the at least two brake discs, when the actuation means is actuated, initially to move together as a unit, until one of the discs is stopped in its axial movement by engagement with an axially fixed one of the friction elements (usually the friction element fixed to the end structure of the fixed caliper), whereupon the other one of the discs moves axially towards that one of the discs. In other words, in this embodiment, although the discs initially move as a unit in taking up clearances, the discs then must move towards each other by means of one of the discs stopping and the other continuing to move. The spring structure disclosed in the embodiments permits such relative movement at this stage in the application process. More specifically still, on initiating brake actuation, initial axial movement of the inboard brake disc causes it to pick-up the centre friction element assembly, then the outboard disc is stopped by contact with the fixed outboard friction element, and the inboard disc continues moving towards the outboard disc, pushing the centre friction element assembly into contact with the outboard disc.

It will be understood from the foregoing that in order for the friction elements to move as a unit, as described above, followed by the sequence of clamping steps as the (usually outboard) disc engages its fixed friction element, there is a need for the frictional forces between the potentially relatively movable parts to be arranged accordingly to achieve the desired result. In other words, the level of friction between the brake discs themselves and their mounting hub as compared with the corresponding level of friction between the resilient means and the discs, must be such as to enable the resilient means/springs to produce the required axial movement of the discs.

Likewise, the appropriate level of frictional force is needed between the resilient means/springs and the hub itself. In the illustrated embodiment, the resilient mean are effectively positively keyed or coupled to the inboard brake disc by the receptors formed in the springs. However, in the case where a non positive coupling is provided and frictional engagement is relied-upon then appropriate spring force and frictional contact areas are needed to achieve the required spring movement with the brake discs, as a unit.

In another embodiment of the invention, the arrangement is such that while the brake discs themselves simultaneously move axially on initiation of brake application, there is not a requirement for the resilient means or springs themselves necessarily to move axially with the brake discs for this purpose. In this regard, while in the illustrated embodiment, one of the two brake discs is itself lodged or located in a locating receptor therefor, and the other is freely slidable with respect to an axially-extending portion of the spring assembly, so that simultaneous movement of both discs necessarily implies simultaneous movement of the spring or resilient means structure likewise, this however may not be essential for all practical embodiments of the invention.

A significant practical aspect of the operation of the resilient means or springs in the described embodiments relates to their dual functions in terms of, firstly, exerting an outward bias on the brake discs so as to provide a stabilising and disc-controlling effect under the dynamic conditions of disc usage. Such is to be understood to produce a disc anti-tilt effect which is of real practical significance under the dynamic conditions of use of the brake.

Secondly, the resilient means or springs serve also to ensure that the two or more discs which are axially slidably mounted on their associated hub for brake initiation purposes respond simultaneously to the actuation force applied to the assembly, instead of responding in sequence, as would be expected from the fact that the actuating thrust applied to the assembly is derived from a piston and cylinder assembly at one side only thereof.

We have discovered that there are significant practical implications of arranging for the discs to move simultaneously upon brake initiation, including such factors as balanced response to brake initiation and the avoidance of uneven friction or friction element wear.

Such factors are of significant importance in terms of achieving ever increasing service intervals for wearing automotive components.

Thus, we have discovered that the mounting of axially-slidable brake discs for actuation by hydraulic, mechanical or electric actuator means, particularly in the case of an assembly in which the actuating thrust is derived from an actuator at one side only of the apparatus, there are significant practical advantages to be achieved by the use of an arrangement in which the initiation of braking is commenced by simultaneous movement of both or all brake discs. This, we have also discovered, can be achieved by a common disc bias spring assembly, in which each of the two or more discs is supported on at least three springs or resilient means acting between the disc and the mounting hub. Moreover, we have found that by adopting a spring structure in which each spring has a significant axial extent or length such that both brake discs can be received thereon, there can be achieved an effect on the twin disc (or more discs) assembly whereby the discs have a very strong tendency to move (under the actuating force) simultaneously with respect to the mounting hub. As a result, upon initiation of braking there is an immediate engagement of friction faces at both sides of the brake rather than the conventional sequential engagement. As a result friction element wear and friction element kinetic energy dispersal is significantly more uniform. In short, instead of the friction faces at the non-actuating side of the brake being the last to be engaged, they are in fact engaged substantially simultaneously with the friction faces adjacent the actuating cylinder (where such is used).

Usually, to achieve such simultaneous movement, the embodiments of the invention mount the twin disc and multiple spring assemblies such that the resultant spring-biased (and linked) structure responds to the actuation forces substantially as a unitary structure. Indeed, as can be seen from the drawings, that structure makes contact with the structure of the mounting hub only at four (per spring) fairly widely spaced and symmetrically located places so that the opportunity for friction force development is minimised.

It is arranged that the level of frictional forces between the resilient means or spring and the friction elements themselves is such as to preferentially favour sliding movement of the entire twin disc and multiple springs assembly on the hub as opposed to separate movements of the discs with respect to the springs. This is achieved by the basic design format of the springs and their interaction with the structure of the brake discs. In the case of the inboard brake disc which is lodged in a receptor groove or locator (of the springs), obviously axial movement relative to the spring is unlikely to occur. However, in the case of the other disc, axial movement of the disc relative to the axially-extending support portion of each spring assembly is entirely possible and indeed necessary in order to achieve full frictional engagement of the brake after initial light contact of the friction surfaces. Such is of course entirely readily provided by the sliding movement of the second or outboard disc along the linear-(ish) portion of the spring assemblies. It will be understood that of course the difference in the ease of axial movement of the two brake discs with respect to the spring assemblies does not affect the ease with which the entire twin disc and spring assemblies construction can move as a body relative to the mounting hub, in order to initiate braking. Such movement is only quite limited in actual extent, amounting to distances of the order of a few millimetres. Such movement however is of great practical significance in relation to the correct operation of the brake however.

An aspect of the construction of the resilient means whereby non-sequential brake disc movement upon braking initiation is, achieved arises from the provision of axial link means interconnecting the slidable friction elements and serving to provide a dynamic mounting for same promoting simultaneous movement of the discs upon brake actuation by physical engagement at their inner peripheries while being mounted itself (the links means) so as to be capable of axial sliding movement with respect to the brake disc mounting hub. An independent aspect of the present invention provides axial link means adapted to interconnect at least two axially slidable brake discs for simultaneous axial sliding movement upon initiation of braking, accordingly. In embodiments, the link means comprises resilient means adapted to spring-bias the discs outwardly with respect to their mounting hub.

In the foregoing disclosure we have concentrated upon the non-sequential or unitary axial movement of the brake discs upon initiation of the braking process, and such movement of the brake discs, at least in the braking initiation phase, is significant for the reasons discussed above. Now however, we look in more detail at the subsequent phases of the movement of the brake discs and consider the significance of these.

It will be understood from the foregoing description that upon initiation of a braking operation, in the case where the brake actuation is effected from an actuator at one side only of the assembly then initially only one of the friction elements moves axially until it contacts the adjacent (usually inboard) brake disc. This disc then begins to move axially and in accordance with the features of the embodiments of the invention the resilient means or link means causes the outboard disc likewise to commence to move axially. It is this latter simultaneous movement of the outboard or other disc (as a unit with the inboard disc) which distinguishes this embodiment of the present invention from previously proposed brakes, in this respect.

In previously proposed brakes of this kind in which the outboard or other disc does not move as a unit with the inboard disc, there is a sequence engagements which occurs, beginning with the inboard friction element engaging the inboard face of the inboard disc, followed by axial movement of the latter until it engages the central or next friction element, which (latter) then commences to move axially and then engages the inboard face of the outboard disc and commences axial movement of that disc which continues until the disc engages the fixed outboard friction element, whereupon the assembly is generally in an axially "solid"

state at which the main braking action commences. It can therefor be seen that in this sequence of engagements it is the inboard disc (or at least the disc adjacent the actuator) which undergoes the first and ongoing frictional engagement with the friction elements adjacent it, and the other disc is only frictionally engaged somewhat later in the sequence. Admittedly, the time intervals are only short and this initial frictional engagement is only light in load as compared with the main braking action. Nevertheless, in modern road conditions these factors are significant and they have a measurable effect on brake disc wear and it can now be seen that in previously proposed designs there is a tendency for the brake disc adjacent the actuator to undergo more wear in such situations than the other disc.

The embodiments of the invention significantly change this state of affairs by providing resilient means or link means which has the effect of moving both discs simultaneously in the actuation direction so that there is likely to be generally simultaneous frictional engagement of both discs with their respective (outboard side) friction elements, whereby the equalisation of wear is promoted.

Furthermore, there is this following additional effect of the embodiments of the invention. The equalisation of wear arising from the greater simultaneity of frictional engagement of the braking surfaces has a further and less immediately expected effect, as follows. During the main braking stage of any given brake application, in which the majority of the kinetic energy is converted to heat at the friction elements, the axially solid (clamped) assembly of friction elements and brake discs is (we have discovered) significantly affected in terms of its inter-friction-face loadings by the history of the immediately preceding brake-initiation steps. It is believed that this effect is due to the very fact that the assembly is indeed solid and frictionally engaged as regards its component elements rather than being in some more mobile state in which inequalities (of inter-face loadings) could adjusted. In other words, when (as in the previously proposed arrangements discussed above) there is a strictly sequential build-up of frictional engagements culminating in final engagement of the outboard disc's outboard face with the fixed outboard friction element, with a corresponding progressive increase in clamping forces and loadings between the frictions elements and the discs as this proceeds, there is the following consequence. That consequence is that the progressive nature of the frictional loading which has preceded final clamp-up tends to be preserved to some degree under the conditions of final and maximum braking force (or clamping effect). To put it another way, the inequalities caused by sequential braking build-up are preserved to the end, to some extent and there is a tendency for the initially-engaged disc (usually the inboard disc) to be preferentially loaded and worn accordingly.

The embodiments of the invention provide a direct means for at least partially offsetting this effect so that there is a more uniform and more simultaneous generation of clamping effect both in the brake initiation phase and in the immediately-following main braking phase. As a result, wear of the brake discs is likely to be more equal and therefor the service interval between a requirement for a replacement disc arising is likely to increase.

There is disclosed in GS-A-23 40 561 A (Federal-Mogul Technology) a disc brake comprising twin slidable discs with four leaf springs acting between the discs and the mounting and driving drum. As stated at page 7 in the first paragraph, each spring 32 is secured in the circumferential centre of one of the surface 20a of the hub by means of a central screw 36 which passes through a hole 32a in the spring 32 and enters the hub 16. Each spring extends axially on the hub throughout the range of axial movement of both discs 12 and 14 so that both discs 12 and 14 are engaged by all four of the springs 32 continuously. From this disclosure it can be seen that the fixed springs engage the discs and the discs are obliged to slide with respect to the fixed springs with serious friction penalties.

THE DRAWINGS

Embodiments of the invention will now be described by way of example with reference to the accompanying drawings in which.

DETAILED DESCRIPTION

Figure 1:
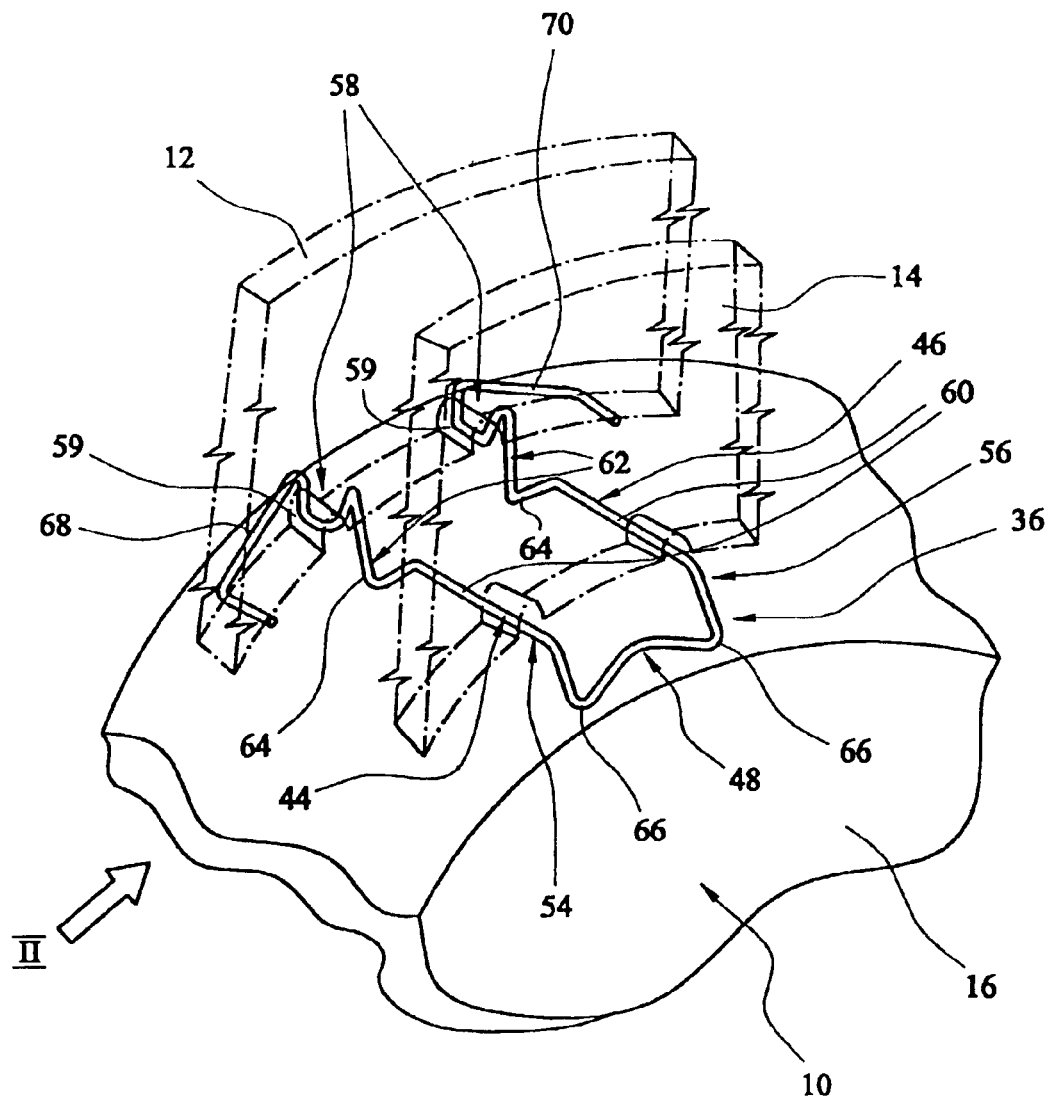
FIG. 1 shows a perspective view of a twin disc brake and mounting hub assembly with an associated wire-format spring or resilient means assembly.

As shown in the drawings, a spot-type automotive disc brake 10 comprises two rotatable brake discs 12, 14 and a rotatable mounting 16 for the brake discs to permit such rotation and which is adapted to drive the brake discs and to have exerted thereon a braking effect by the brake discs when the disc brake is actuated.

Two pairs of friction elements 18, 20 and 22, 24 are provided and adapted to frictionally engage braking surfaces 26, 28 and 30, 32 on opposite sides of the brake discs 12, 14 to effect braking on actuation of actuation means, shown diagrammatically at 34, therefor.

Brake discs 12, 14 are axially slidable in use with respect to the rotatable mounting 16 under the action of the friction elements 18 to 24 and under the action of actuation means 34 during braking.

Resilient means 36 are provided at circumferentially spaced positions around the brake discs and adapted to act between the brake discs and rotatable mounting 16 therefor at those positions.

In FIG. 1, only one of the resilient means 36 is shown, but a minimum of three will be provided and usually at least about six such spring assemblies will be used. The number employed in any given case take account of the details of the disc brake constructions and dynamic factors arising from use, together with the construction of the resilient means themselves.

The resilient means 36 is constructed and arranged so as to be able axially to straddle the twin discs 12, 14 at the several circumferentially spaced positions around the discs and the resilient means act, in use, so as to apply a resilient bias directed between the discs and the rotatable mounting or hub 16 so as to provide an anti-tilt function together with the required degree of dynamic control of the discs.

As will be explained in more detail below, and with reference to the structure of the resilient means 36, the resilient means 36 and the associated brake discs 12, 14 are arranged so as to simultaneously move in the axial direction when braking is initiated by the actuation means.

Figure 2:
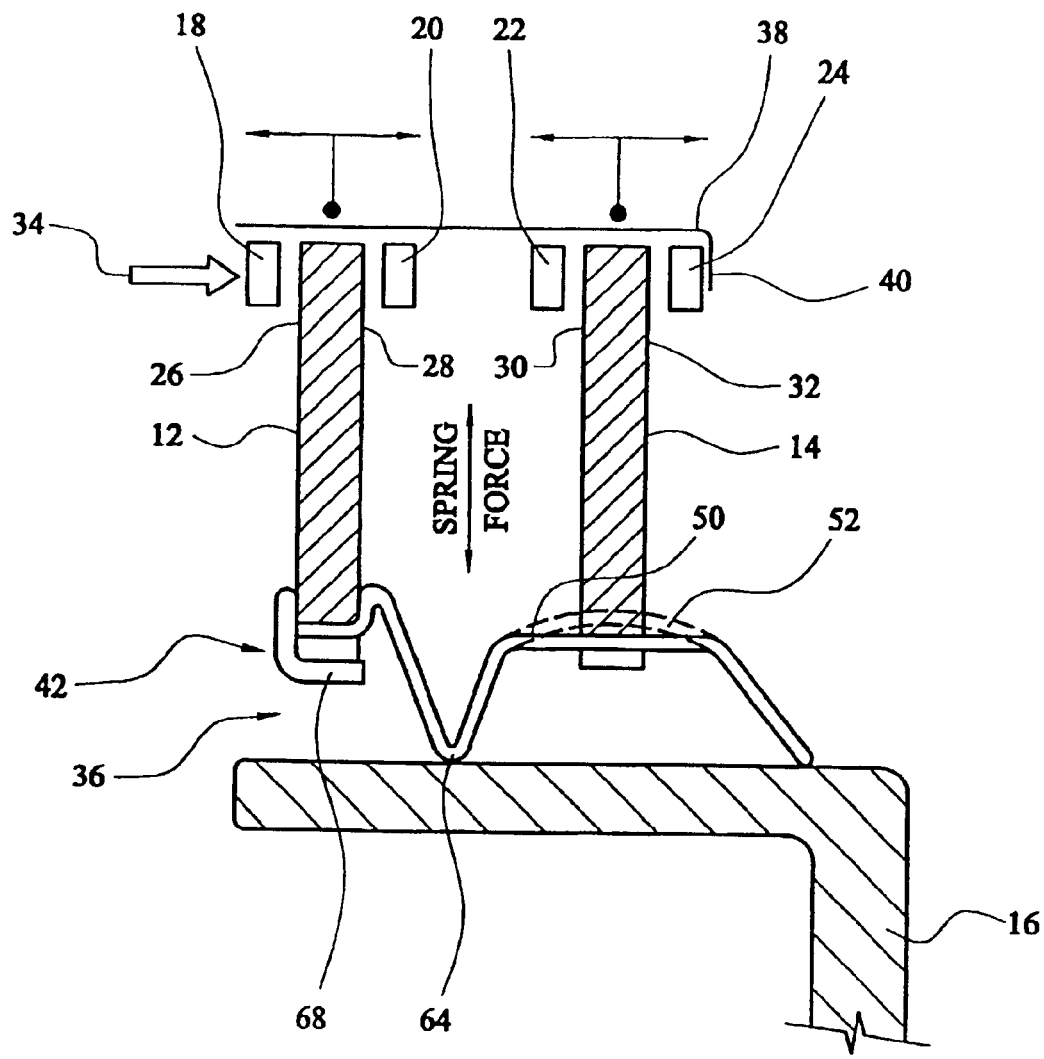
FIG. 2 shows a view of the assembly of FIG. 1 as seen on arrow II in FIG. 1.

With reference to FIG. 2 it is to be noted that the showing of certain elements of the construction of disc brake 10 has been adopted in purely diagrammatic format, this including the already mentioned actuation means 34 (usually constituted by 1 or more hydraulic cylinders hydraulically connected to a driver-operated master cylinder assembly). Likewise, the caliper 38 (which is a fixed structure serving to slidingly support fiction elements 18, 20, 22 and 24 and having a fixed end structure 40 at its outboard end) is likewise indicated diagrammatically. The caliper provides at its inboard side suitable structural integration (with the caliper) for the actuation means 34 in the form of a hydraulic piston and cylinder assembly.

Friction elements 18, 20, 22 and 24 will usually be constructed as an assembly of friction pads with associated metallic backing plates which serve to carry the friction elements on axial-guide means provided by caliper 38. The friction elements 20, 22 located between the discs will usually be constructed as a single structure having a double-faced central metallic backing plate which is effectively sandwiched between the discs and clamped in frictional engagement therewith when braking is initiated.

Turning now to the details of the actual construction of the resilient means 36, it needs to be observed first that in the embodiment of FIGS. 1 and 2, the resilient means 36 is in the form of a wire spring 42 of generally channel-shaped format having side limbs 44, 46 and a bottom connecting limb 48.

The resilient means 36 has two main function, namely a resilience function and a disc-linking function. These will be discussed in turn.

First, the resilience function. As shown in FIG. 2, the side limbs 44, 46 have, in use, a somewhat flattened profile 50 as compared with their unstressed profile 52, whereby an outwardly-directed spring forced is applied to outboard brake disc 14. In a similar way, the inboard ends of side limbs 44, 46 of resilient means 36 are upwardly spring-biased to apply a similar force to inboard disc 12. These spring bias forces are established upon assembly of the discs in relation to the central rotatable mounting hub 16 such being conveniently achieved by means of a method and jig as disclosed in one of our co-pending GB patent applications.

The spring forces established in accordance with the foregoing description act to maintain the discs in an untilted condition under the dynamic conditions of use.

Turning now to the link function of the resilient means 36, this function is likewise provided by the resilient means but is technically distinct from anti-tilt function, as will appear from the following description.

As shown in the drawings, the side limbs 44, 46 of wire spring 42 each extend axially with respect to the discs and serve to link the discs at their inner peripheries in a manner which serves in use to have the result that upon initiation of braking actuation means 34, the thus-generated axial thrust causes simultaneous axial movement of both discs towards the clamped condition in which the friction elements 18 to 24 are in full frictional engagement with the friction surfaces of the discs 10, 12, 14.

As is clearly apparent from FIG. 1 and the generally channel-shaped format of wire spring 42, the latter provides, effectively, twin link means 54, 56 axially linking the discs for such simultaneous axial movement in use. In this embodiment, each of the link means 54, 56 comprises a disc-locating receptor 58 of generally channel-shaped format, and positioned (to be received in grooved locators 59 formed on hub 16) at the inboard side of the assembly, together with a generally somewhat linear portion 60 which is linked to receptor 58 by a joggled portion 62 which serves to provide a generally v-format hub bearing element 64, to provide a relatively low friction-force contact region for the wire spring with hub 16. A similar outboard hub bearing 66 is provided at the outboard end of each of the side limbs 44, 46 to provide a similar low frictional force bearing function.

The inboard end of the side limbs 44, 46 is completed in each case by a torsion arm 68, 70 which serves to provide spring wind-up on assembly by insertion under the inner periphery of the inboard disc to generate spring load within the wire spring construction for the purposes described above.

Turning now to the operation of the disc brake 10, upon assembly of the brake discs 12, 14 in relation to the rotatable mounting hub 16, the resilient means 36 (numbering between 3 and 6 per wheel brake, depending upon the construction and other requirements of the particular automotive vehicle) are installed with the wire springs 42 in a stressed condition. This causes outward load to be applied generally equally to the brake discs and thus causes likewise the effect of disc tilt-control and disc dynamic control during use.

As regards the disc link function of the resilient means 36 and the simultaneous movement of the discs 12, 14 upon initiation of brake actuation, such occurs as follows. When actuation means 34 applies a generally outboard-directed force to the inboard friction element 18, this causes direct and immediate movement of that friction element and likewise of the inboard disc 12 together with the (series of) resilient means 36 and the link means 54 which are both constituted by wire springs 42.

Each wire spring 42 moves with the inboard disc 12 because the two structures are positively interconnected by the disc receptor 58 of each of the side limbs 44, 46. Therefore, as braking is initiated, not only is there an immediate movement of the inboard disc and its associated friction elements in the axial direction, but also a simultaneous axial movement of the entire pair of link means 54, 56 or side limbs 44, 46 (which are the same structures and form part of wire spring 42).

At this point is noteworthy to draw attention to the flattened and unstressed profiles 50, 52 respectively of the side limbs 44, 46 which give a measure of the sliding frictional engagement force acting between each of the wire springs and the inner periphery of outboard brake disc 14. In short, the connection between the link means or side limbs 44, 46 and the outboard disc 14 amounts to a sliding frictional connection which likewise simultaneously transmits axial drive to the outboard disc and initiates its simultaneous movement. Thus, by virtue of the frictional axial drive connection, the outboard disc 14 is simultaneously axially moved with inboard disc 12. Likewise, by virtue of the fact that the drive is only frictional and not a positive drive, the drive is interrupted very shortly after it has commenced and the outboard disc can then slip relative to the side limbs 44, 46 as the (very small) clearances which need to be taken up to achieve full brake engagement are indeed taken up.

Summarising, the discs initially move as a unit. The inboard disc then picks-up the centre friction element assembly. Then, the outboard disc is stopped by contact with the fixed friction element, and the inboard disc then moves towards the outboard disc pushing the centre friction element assembly into contact with the inboard face of the outboard disc.

Thus it can be seen that each of the wire springs 42, which likewise constitute and provides the link means 44, 46 is constructed so as to provide a direct and positive drive between itself and inboard disc 12 which ensures that it (the wire spring) moves positively with inboard disc 12. Then, in addition, the link means of the wire spring also provides a frictional coupling to the outboard disc which permits an initial friction drive which can then slip in order for braking clearances to be taken up.

It would be possible for the skilled person to redesign some of the details of the link means 54, 56 while still achieving the necessary degree of simultaneity of movement of the brake discs. It is thought likely however that the preferred approach will be to provide a positive drive coupling to one disc and a frictional slippable drive coupling to the other disc or discs.

What is claimed is:

1. A method of mounting a brake disc in a spot-type disc brake, the disc brake comprising:
   a) at least two rotatable brake discs;
   b) a rotatable mounting for said brake discs to permit such rotation and which is adapted to drive said brake discs and to have exerted thereon a braking effect by said brake discs when the brake is actuated;
   c) at least three friction elements adapted to frictionally engage braking surfaces of opposite sides of said brake discs to effect braking on actuation of an actuation device therefor;
   d) said brake discs being axially slidable in use with respect to said mounting therefor under the action of said friction elements and said actuation device therefor during braking;
   e) resilient structure being provided at circumferentially spaced positions around said brake discs and adapted to act between said brake discs and said mounting therefor at said positions;
   said method comprising:
   f) providing said resilient structure adapted axially to straddle said at least two discs at said circumferentially spaced positions around said at least two brake discs, and causing said resilient structure when so located to apply a resilient bias directed between said discs and said rotatable mounting for said brake discs; and
   g) simultaneously moving said resilient structure with said at least two brake discs as a unit when said actuation device is actuated.

2. A method of mounting a brake disc in a disc brake comprising providing resilient structure, positioning the resilient structure between at least two brake discs and a rotatable mounting on which the discs are supported for rotation with the rotatable mounting and for relative sliding movement, the positioning of the resilient structure being at circumferentially spaced positions around the discs, and axially straddling the discs to cause the discs to move axially together with respect to the rotatable mounting upon application of an axial movement force to one of the discs.

3. A method according to claim 1, including moving the discs together until one of the discs confronts a stationary one of the friction elements, after which the other of the discs is moved relatively axially toward the one disc.

4. A spot type disc brake comprising:
   a) at least two rotatable brake discs;
   b) a rotatable mounting for said brake discs to permit such rotation and which is adapted to drive said brake discs and to have exerted thereon a braking effect by said brake discs when the disc brake is actuated;
   c) at least three friction elements adapted to frictionally engage braking surfaces on opposite sides of said brake discs to effect braking on actuation of an actuation device therefor;
   d) said brake discs being axially slidable in use with respect to said mounting therefor under the action of said friction elements and said actuation device therefor during braking;
   e) resilient structure being provided at circumferentially spaced positions around said brake discs and adapted to act between brake discs and said rotatable mounting therefor at said positions;
   f) said resilient structure being adapted axially to straddle said at least two discs at said circumferentially spaced positions around said at least two brake discs, and said resilient structure when so located being adapted to apply a resilient bias directed between said discs and said rotatable mounting for said brake discs; and
   g) the arrangement being such that during use of said brake said resilient structure and said at least two brake discs simultaneously move as a unit in the axial direction when said actuation device is actuated.

5. A brake according to claim 4, wherein the assembly of said resilient structure and said at least two brake discs being adapted so that, when said actuation device is actuated, the assembly initially moves as a unit, until one of said discs is stopped in said axial movement by engagement with an axially fixed one of aid friction elements, whereupon the other one of said discs moves axially towards said one of said discs.

6. A disc brake according to claim 4, wherein said resilient structure cooperates with locating grooves formed in said rotatable mounting for said brake discs.

7. A disc brake according to claim 4, wherein said resilient structure comprises at least one leaf spring adapted to receive said discs on an axially extending receptor structure.

8. A disc brake according to claim 4, wherein said resilient structure comprises wire springs each formed with a disc locating receptor for one of the discs at one axially side of the spring structure and an axially-extending disc guide structure extending therefrom.

* * * * *